Sept. 6, 1960     W. D. ANTRIM, JR., ET AL     2,951,570
STARTER DECOUPLING MEANS
Filed Nov. 25, 1958     2 Sheets-Sheet 1

INVENTORS.
FRANK J. KUDAROSKI
BY WILLIAM D. ANTRIM, JR.

Lawrence G. Norris
ATTORNEY

Sept. 6, 1960
W. D. ANTRIM, JR., ET AL
2,951,570
STARTER DECOUPLING MEANS
Filed Nov. 25, 1958
2 Sheets-Sheet 2
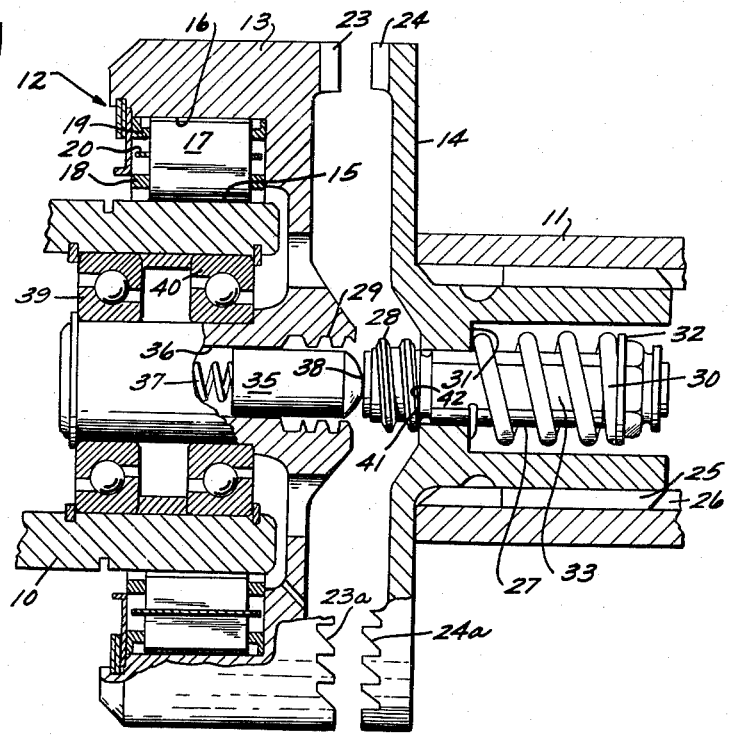
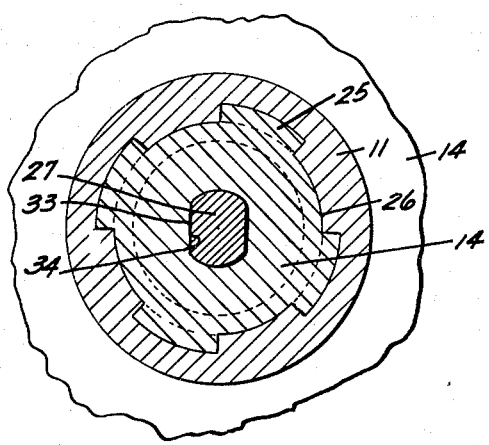
INVENTORS.
FRANK J. KUDAROSKI
BY WILLIAM D. ANTRIM, JR.
Lawrence G. Norris
ATTORNEY United States Patent Office 2,951,570
Patented Sept. 6, 1960

2,951,570

STARTER DECOUPLING MEANS

William Drown Antrim, Jr., Nahant, and Frank Joseph Kudaroski, Melrose, Mass., assignors to General Electric Company, a corporation of New York Filed Nov. 25, 1958, Ser. No. 776,344

5 Claims. (Cl. 192—101)

Our invention relates to engine starters and in particular to starters for aircraft gas turbine engines.

As is well known in the art, it is a common practice to employ separately powered starting devices in gas turbine engines. Such devices are usually attached to a mounting pad on the engine and are provided with an output shaft which is connected through suitable gearing to the rotor of the engine. Upon the attainment of a preselected, self-sustaining speed of the main engine rotor, the power to the starter is shut off and suitable clutching means are activated to prevent the engine from driving the starter to excessive speeds as the engine is accelerated to its normal operating speed range.

Several types of clutching arrangements have been commonly employed in gas turbine engine starting devices of the foregoing type. One of these is the jaw clutch type of arrangement wherein the starter is provided with a toothed clutch element which is movable axially into and out of engagement with a mating clutch element on the engine input shaft. Another common arrangement is of the type commonly known as an "overrunning clutch." Devices of this type usually comprise a number of torque transmitting elements located in an annular space between a driving and a driven member. The torque transmitting elements are of such a shape and are positioned such as to seize or bind to provide a driving connection when relative rotation of the driving and driven members is attempted in one direction and to slip or overrun upon relative rotation of the driving and driven members in the opposite direction. Thus, the overrunning clutch may be connected between the starter and the engine so that the starter is capable of driving the engine up to the preselected speed where the power to the starter is cut off with the engine being incapable of driving the starter in the same direction because of the overrunning characteristic of the clutch.

It will be recognized, however, that with the overrunning clutch type of connection, the clutch must continue to overrun throughout the entire period of engine operation once the starter has been cut off. This disadvantage has been somewhat alleviated by the provision of overrunning clutch configurations wherein the torque transmitting elements are removed from rubbing contact with the driving member of the starter by the centrifugal force exerted on these elements. It will be appreciated, however, that any malfunction in the clutch mechanism, or in the bearings on which the clutch overruns, which causes a failure in the overrunning characteristic of the clutch can cause the starter to be driven at excessive speeds by the engine with the possibility of a resulting disintegration and catastrophic failure of the starter.

In view of the foregoing, it is an object of our invention to provide an improved overrunning clutch arrangement for a gas turbine engine starter in which provision is made for decoupling the starter from the engine in the event that a failure or malfunction of the overrunning clutch mechanism or a clutch bearing failure causes the application of a driving torque on the starter.

Briefly stated we accomplish this by providing a reverse torque coupling between the engine and the starter. The coupling is provided with a pair of coupling members having inclined plane means which, upon the application of a reverse torque to the coupling, produce an axial force component tending to separate the coupling members. When the reverse torque applied to the coupling exceeds a preselected level, the coupling members are forced apart and relative rotation occurs. A second inclined plane means, extending between the two coupling members, responds to the relative rotation to move the two coupling members permanently out of engagement with each other and means associated with the second inclined plane means are provided for holding the two coupling members out of engagement by means of point contact to minimize frictional drag. As explained below, the arrangement is such as not to interfere with the normal operation of the overrunning clutch.

Our invention will be better understood and other objects and advantages thereof will be apparent from the following description taken in connection with the accompanying drawings in which:

Fig. 3 is a cross sectional view of the embodiment of Fig. 1 showing the elements in the disengaged position after operation of the reverse torque release; and Fig. 4 is a sectional view taken along the plane 4—4 of Fig. 1.

Figure 1:
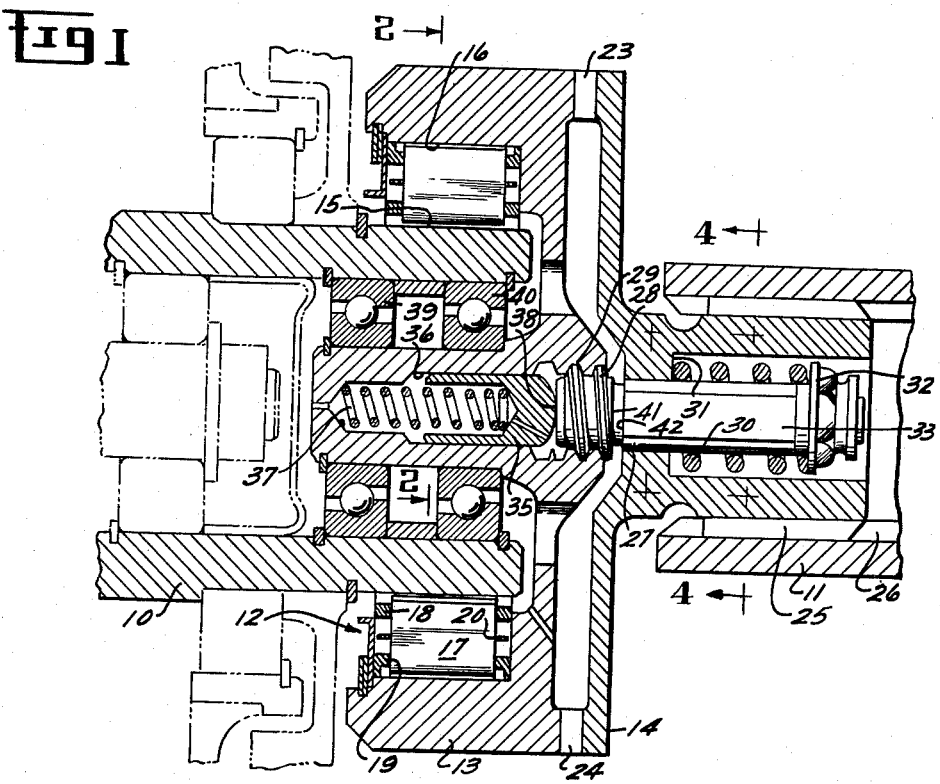
Fig. 1 is a cross sectional view of a gas turbine starter clutch assembly, shown together with the engine input shaft, and embodying our invention.

Referring now to Fig. 1, there is shown a gas turbine starter clutch arrangement in which 10 represents the output shaft of the starter. The output shaft 10 is connected in driving relationship to an input shaft 11 of a gas turbine engine through an overrunning clutch 12 and intermediate elements 13 and 14. The shaft 11 is connected through suitable gearing to the rotor of the engine to be started.

Figure 2:
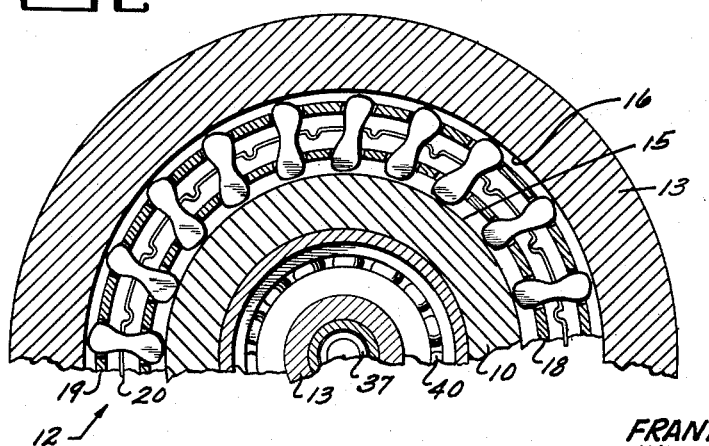
Fig. 2 is a sectional view taken along the plane 2—2 of Fig. 1.

The output shaft 10 is provided with a portion 15 which forms the inner race of the overrunning clutch 12, the outer race being formed on the inner surface 16 of element 13. As seen in Figs. 1 and 2, the overrunning clutch includes a number of torque transmitting element or "sprags" 17 extending between the inner and outer race surfaces 15 and 16. The elements 17 are held in spaced relationship to each other by retainer rings 18 and 19 and by a spring element 20. The shape of the elements 17 and their positioning relative to the other elements of the clutch assembly are such that a slight clockwise rotation (in the direction of the arrow in Fig. 2) of the driving member 10 relative to the driven member 13 causes a canting of the elements 17 resulting in a seizure or binding of these elements between the race surfaces 15 and 16. Thus, further clockwise of the driving member 10 results in the transmission of torque between the driving member 10 and the driven member 11 through the elements 17. Clockwise rotation of the driven member 13 relative to the driving member 10, on the other hand, results in a canting of the elements 17 in the opposite direction to allow slipping or overrunning of the outer race 16 relative to the inner race 15.

The outer retaining ring 19 is secured to the outer race member 13 in any suitable manner so that the clutch elements 17, 18, 19 and 20 are carried by and driven at the speed of the outer race member 13.

The normal direction of rotation of the starter when driving the engine up to self-sustaining speed during a start is clockwise, as shown in Fig. 2. Thus, during the start cycle, the outer race member 13 is driven in the clockwise direction through the clutch elements 17.

The outer race member 13 is provided with a series of axially extending projections or teeth 23, best seen in Fig. 3, which are engageable with mating projections or teeth 24 extending axially from the engine dog or driving member 14. The engine driving member 14 is provided with an externally splined portion 25 which meshes with an internally splined portion 26 on the engine drive shaft 11.

With the elements positioned as shown in Fig. 1, the engine driving member 14 is supported on the outer race member 13 by means of a mounting shaft 27, which is provided with an externally threaded portion 28 engaging an internally threaded portion 29 in the outer race member 13. The threaded portions 28 and 29 form mating inclined plane surfaces, the function of which will later be set forth. The members 13 and 14 are held into axial engagement with each other by means of a spring 30, which bears at one end against a surface 31 on the member 14 and at the other end against an axially adjustable nut element 32 threaded onto the end of the shaft 27.

The shaft 27 is provided with one or more flat surfaces 33 thereon which engage mating flat surfaces 34 (shown in Fig. 4) in the member 14. Thus, the shaft 27 and the member 14 are capable of axial movement relative to each other but are secured against relative rotative movement by the mating flat surfaces 33 and 34. A plunger 35 is mounted in a centrally located bore 36 in the member 13 and is spring-loaded by means of a spring 37 to bear against the end of the shaft 27.

The outer race member 13 is mounted in bearings 39 and 40 secured within the starter output shaft 10. The bearings 39 and 40 permit relative rotation between the outer race member 13 and the drive shaft 10 and also serve to maintain concentricity between the inner and outer race surfaces 15 and 16 of the overrunning clutch.

During the normal start cycle, torque is transmitted from the starter output shaft 10 through the overrunning clutch elements 17, the outer race member 13, mating teeth 23 and 24, and the engine driving member 14 to the engine input shaft 11. Once the engine has been brought up to a preselected self-sustaining speed, the power to the starter is cut off. In the case of a fuel-air starter employing a turbine driven from the products of combustion of engine fuel and compressed air, this is accomplished by actuating suitable valve means from a speed sensing device to cut off the flow of fuel and air to the starter combustion chamber when a preselected speed is attained.

After the power to the starter has been cut off, the engine continues to accelerate to its normal operating speed range, the starter coasting down to a complete stop during the process. It will be seen that once the speed of the engine drive shaft 11 exceeds that of the starter shaft 10, the outer race member of the clutch begins to rotate in the clockwise direction (as viewed in Fig. 2) relative to the inner race member 10, thus causing the clutch to overrun in the manner previously set forth, the driving torque for the outer race 13 being transmitted in the reverse direction through the teeth 23 and 24 against inclined plane surfaces 23a and 24a provided thereon.

It will be appreciated that the transmission of reverse torque through facial contact of the inclined surfaces 23a and 24a of teeth 23 and 24 creates an axial component of force tending to force the elements 13 and 14 apart. The axial force component is balanced, under normal operating conditions, by the opposing force of the spring 30, which holds the members 13 and 14 into axial engagement with each other.

Thus, under normal operating conditions, once the start cycle has been completed, the outer rate member 13 continues to rotate, being driven by the engine shaft 11 and overrunning the starter shaft 10 throughout the operating period of the engine. In the overruning condition, the clutch elements 17, 18, 19 and 20 are carried by and rotate with the outer race member 13 as explained above. Under these conditions, the centrifugal force generated on the elements 17 causes them to tilt out of engagement with the inner race surface 15 so that the overrunning takes place without rubbing contact between the elements 17 and the inner race 15, the positioning of the outer and inner races being maintained by the bearings 39 and 40.

In the event of a malfunction in the overrunning clutch, however, such as to cause binding or seizing of the clutch 12 of a sufficient magnitude to cause transmittal of a reverse torque to the starter shaft 10, the reverse torque arrangement of our invention will operate to decouple the starter from the engine and move the elements to the position shown in Fig. 3. The operation of the embodiment of our invention set forth herein will now be described.

It will be appreciated that in the vent of a malfunction of the overrunning clutch, the reverse torque imposed on the starter by the engine will be greatly increased. We have found, for instance, in one application of our invention that the normal reverse torque transmitted when the overrunning clutch is functioning properly is less than .25 ft.-lbs., whereas the amount of reverse torque required to drive the starter at its rated speed through a locked clutch was in the order of 26 ft.-lbs. This increased reverse torque was made up only of the windage and friction loads represented by the starter and in the event of a failure of the clutch, would in most cases exceed this level by reason of the additional torque required to accelerate the inertia of the starter elements.

The axial component of force generated by the increased face loading of the inclined surfaces 23a and 24a of the teeth 23 and 24 will therefore be correspondingly increased under the conditions just described. The axial force exerted by the spring 30 against the member 14 is of a magnitude such that, under these conditions, is less than the axial component of force generated by the reverse torque. The tooth surfaces 24a on the member 14 will therefore ride up on the surfaces 23a on the member 13 compressing the spring 30 and force the members 13 and 14 apart. The member 14 will then begin to ratchet in the clockwise direction (when viewed in the direction of Fig. 2) relative to the member 13.

As this relative rotation between the members 13 and 14 takes place, the shaft 27 is rotated along with the member 14 until the threaded portion 28 on the shaft 27 is disengaged from the threads 29 in the member 13. During this process, the shaft 27 moves axially with respect to the member 14 to bring a shoulder portion 41 on the shaft 27 into engagement with a surface 42 on the member 14 so that continued axial movement of the shaft 27 beyond that point forces the member 14 out of engagement with the member 13, the splined portion 25 on member 14 sliding axially in the spline 26 of the engine shaft 11 in the process. Once the threaded portion 28 has been fully disengaged from the threads 29, the spring 37, acting through the plunger 35, exerts an axial force against the end face of the shaft 27 of sufficient magnitude to hold the elements 13 and 14 out of axial engagement with each other. The position of the elements after disengagement has been effected in the foregoing manner is as shown in Fig. 3.

Thus, the reverse torque decoupling arrangement described above is capable of disengaging the engine from driving relationship with the starter in the event of a malfunction either of the overrunning clutch or of the overrunning bearings 39 and 40, thereby preventing the starter from being driven to a dangerous overspeed level. After the decoupling arrangement has functioned, the engine member 14 can continute to rotate relative to the starter member 13, the only contact between the two assemblies being the single point at which the spherical surface 38 on the plunger 35 engages the end of the shaft 27.

It will be appreciated that once a malfunction in the overrunning clutch or its bearings has occurred, and the decoupling arrangement has operated to disengage the starter from the engine, any further attempts to start the engine will result merely in the acceleration of the started to its preselected cut-out speed with its control system removing the power from the starter once that speed is attained, the engine remaining at a standstill throughout the cycle. The occurrence of such a cycle gives notive that a malfunction has occurred and that suitable corrective action must be taken before the starter can be used to start the engine.

It will be recognized that the various elements of the embodiment of our invention set forth herein may be modified from the forms illustrated. For instance, the inclined plane surfaces 23a and 24a on the teeth 23 and 24 may be modified in form or disassociated from the teeth 23 and 24 so long as they serve to provide an axial force component proportional to the magnitude of reverse torque and in a direction tending to force the coupling members apart. The inclined plane surfaces formed by the threaded portion 28 and 29 may be similarly modified.

Thus, it is apparent that various modifications, substitutions and changes may be made in the embodiment of our invention presented herein without departing from the true scope and spirit of our invention as defined in the appended claims.

What we claim as new and desire to secure by Letters Patent is:

1. A reverse torque decoupling arrangement comprising a pair of coupling members, at least one of said coupling members being movable relative to the other of said coupling members between an engaged position and a disengaged position, said engaged position forming a connection permitting the transmission of torque through said coupling members in a first direction, said connection being interrupted in said disengaged position, spring means urging said coupling members into the engaged position, inclined plane means carried by said coupling members and positioned to produce an axial force component tending to separate said coupling members in response to the transmission of torque through said coupling members in a direction opposite to said first direction, whereby upon the transmission of a torque in said opposite direction in excess of a preselected magnitude the force exerted by said spring means is overcome by said axial force component and said coupling members are forced apart permitting relative rotation to occur, second inclined plane means carried by said coupling members and being actuable by relative rotation of said coupling members to move said coupling members apart to the disengaged position, and means associated with said second inclined plane means to release said spring means and remove said spring force as said coupling members are moved to the disengaged position.

2. A reverse torque decoupling arrangement as set forth in claim 1 including second spring means actuable by said second inclined plane means to resiliently hold said coupling members apart in the disengaged position.

3. Reverse torque decoupling means comprising in combination with an overrunning clutch for transmitting torque in a first direction, first and second coupling members, at least one of said coupling members being axially movable relative to the other of said coupling members between an engaged position forming a torque transmitting coupling and a disengaged position in which said connection is interrupted, said torque transmitting coupling formed by said coupling members being in series torque transmitting relationship to said overrunning clutch, a shaft releasably secured in the axial direction to said first coupling member, spring means acting between said shaft and said second coupling member to urge said second coupling member into the engaged position, first inclined plane means acting between said coupling members to force said coupling members apart against the force of said spring means upon the application of a torque in a direction opposite said first direction and in excess of a preselected magnitude, whereby relative rotation of said coupling members is permitted to occur, and second inclined plane means acting between said shaft and said first coupling member to force said coupling members apart to the disengaged position and release said shaft from said first coupling member to remove the spring force urging said coupling members into engagement.

4. A reverse torque decoupling device comprising in combination with an overrunning clutch for transmitting torque in a first direction, first and second clutch members having teeth thereon of saw-tooth shape and including inclined surfaces on the reverse sides thereof such that the transmission of torque through said teeth in a direction opposite to said first direction is accomplished through face to face contact of said inclined surfaces, said clutch members forming a torque transmitting connection in series with said overrunning clutch, a shaft extending along the rotational axis of said clutch members, inclined plane means releasably securing said shaft to said first clutch member, means on said shaft member engageable with said second clutch member to permit said second clutch member to be moved axially away from said first clutch member by axial movement of said shaft, spring restraining means on said shaft, spring means acting between said spring restraining means and said second clutch member to urge said second clutch member into meshing engagement with said first clutch member, whereby upon the application of a torque to said second clutch member in a direction opposite to said first direction and in excess of a preselected magnitude said second clutch member is caused to ratchet against said first clutch member, said inclined plane means on said shaft member being responsive to said ratcheting movement to force said clutch members apart and release said shaft from said first clutch member to simultaneously remove spring force urging said clutch members into engagement, and second spring means acting between said first and second clutch members to resiliently urge said clutch members into the disengaged position.

5. A reverse torque decoupling device as set forth in claim 4 wherein said second spring means comprises a spring loaded plunger mounted in said first clutch member and having a curved surface thereon engaging said shaft member along the rotational axis of said clutch members.

References Cited in the file of this patent

UNITED STATES PATENTS

| 1,118,683 | Rindfleisch | Nov. 24, 1914 |
| 1,288,087 | McGrath | Dec. 17, 1918 |
| 1,752,937 | Barrett | Apr. 1, 1930 |
| 2,721,482 | Shank et al. | Oct. 25, 1955 |

FOREIGN PATENTS

| 981,923 | France | Jan. 24, 1951 |
| 686,237 | Great Britain | Jan. 21, 1953 |